United States Patent

Bonvallot et al.

[11] Patent Number: 5,807,906
[45] Date of Patent: Sep. 15, 1998

[54] PROCESS FOR OBTAINING A TRANSPARENT ARTICLE WITH A REFRACTIVE INDEX GRADIENT

[75] Inventors: Dominique Bonvallot; Daniel Joseph Lougnot, both of Mulhouse, France

[73] Assignee: Essilor International-Compagnie Generale D'Optique, France

[21] Appl. No.: 606,782

[22] Filed: Feb. 27, 1996

[30] Foreign Application Priority Data

Feb. 27, 1995 [FR] France .................................. 95 02266

[51] Int. Cl.⁶ ....................................................... C08F 2/46
[52] U.S. Cl. ............................ 522/182; 522/2; 430/330; 430/288.1; 430/285.1; 430/286.1
[58] Field of Search ....................... 522/2, 182; 430/330, 430/288.1, 285.1, 286.1

[56] References Cited

U.S. PATENT DOCUMENTS

| | | | |
|---|---|---|---|
| 4,022,855 | 5/1977 | Hamblen | 264/1 |
| 4,312,916 | 1/1982 | Kakumaru et al. | 428/345 |
| 4,576,850 | 3/1986 | Martens | 428/156 |
| 4,814,257 | 3/1989 | Galloway | 430/278 |
| 4,833,207 | 5/1989 | Kinaga et al. | 525/276 |
| 4,943,150 | 7/1990 | Deichert et al. | 351/177 |
| 4,985,564 | 1/1991 | Kakumaru et al. | 546/104 |
| 5,089,377 | 2/1992 | Kakumaru et al. | 430/325 |
| 5,095,079 | 3/1992 | Yean et al. | 526/60 |
| 5,258,024 | 11/1993 | Chavel et al. | 623/5 |
| 5,258,144 | 11/1993 | Yean et al. | 264/1.7 |
| 5,296,305 | 3/1994 | Baude et al. | 428/520 |
| 5,356,754 | 10/1994 | Kushi et al. | 430/288 |
| 5,403,698 | 4/1995 | Tachiki et al. | 430/286 |
| 5,532,286 | 7/1996 | Burns et al. | 522/37 |

FOREIGN PATENT DOCUMENTS

| | | | |
|---|---|---|---|
| 0407294 | 1/1991 | European Pat. Off. | C08F 263/00 |
| 483982 A2 | 5/1992 | European Pat. Off. | G02B 1/00 |
| 504011 A1 | 9/1992 | European Pat. Off. | G02B 3/00 |
| 2661914 | 11/1991 | France | C08J 7/18 |
| WO90/13832 | 11/1990 | WIPO | G02B 5/18 |

OTHER PUBLICATIONS

Patent Abstracts of Japan, vol. 8, No. 180 (M–318) Aug. 18, 1984 and JP–A–59 071830 (Nihon Ita Glass K.K.), Apr. 23, 1984.

Patent Abstracts of Japan, vol. 9, No. 94 (M–374) Apr. 24, 1985 and JP–A–59 220333 (Nihon Ita Glass K.K.), Dec. 11, 1984.

Applied Optics, vol. 24, No. 24, Dec. 15, 1985, Yasuji Ohtsuka & Yasuhiro Koike, "Studies on the light–focusing plastic rod . . . " (pp. 4316–4320).

"Free Radical Copolymerization Reactivity Ratios", Robert Z. Greenley, Monsanto Co., St. Louis, Missouri; pp. II/153 to II/163.

Primary Examiner—M. Nuzzolillo
Assistant Examiner—Steven H. VerSteeg
Attorney, Agent, or Firm—Jones, O'Keefe, Egan & Peterman

[57] ABSTRACT

Process for obtaining a transparent article with a refractive index gradient, including the steps of: (1) irradiating a crosslinkable liquid mixture of base photopolymerizable monomers which is modulated spatially in intensity and/or irradiation time to form a structure gradient according to a desired index profile until a self-supporting polymer matrix is obtained; (2) swelling the polymer matrix to thermodynamic equilibrium in a swelling composition containing a polymerization initiator and one or several polymerizable monomers producing a polymer of different refractive index from the refractive index of the matrix obtained in step (1); and (3) polymerizing the swelling composition which has diffused into the matrix homogeneously, thereby obtaining a transparent article with a refractive index gradient.

32 Claims, 4 Drawing Sheets

SCREEN

PROCESS FOR OBTAINING A TRANSPARENT ARTICLE WITH A REFRACTIVE INDEX GRADIENT

FIELD OF THE INVENTION

The present invention relates to a process for obtaining a transparent article with a refractive index gradient.

BACKGROUND OF THE INVENTION

An optical article is characterized by its geometry, its thickness and its refractive index; the latter is often homogeneous. A refractive index gradient in an optical material offers an additional degree of freedom with regard to the use of the article. In fact, the gradient allows the optical path of the rays to be varied independently of the geometry of the article.

Three types of refractive index gradients are generally distinguished:

the axial index gradient: the index varies in a given direction; it is homogeneous in any plane perpendicular to this direction;

the radial index gradient: the index varies along the distance from a given axis; it is homogeneous over any cylindrical surface of a given radius and of the same axis as the gradient;

the spherical index gradient: the index varies along the distance from a given point; the isoindex surfaces are spherical.

An optical equivalence has been demonstrated between a plane-convex (or plane-concave) lens with a homogeneous index and a lens with a radial index gradient in which the index decreases from the centre towards the edge (or from the edge towards the centre). It has recently been proved that a lens of homogeneous index with an aspherical surface of revolution could be replaced by a combination of spherical surfaces and of an appropriate axial index gradient.

The objective of the production of optical articles with a refractive index gradient is especially to design simpler optical systems with a performance equal to that obtained with systems consisting of optical components with a homogeneous index. Such a production makes it possible to manufacture, for example, optical systems with multiple components the number of which would thus be reduced, or else to produce correction glasses or lenses of smaller thickness or simpler geometry.

Furthermore, optical articles with a radial or spherical index gradient offer numerous applications in optoelectronics or in telecommunications when the index distribution has a parabolic profile. Properties of focusing light at a very short distance are obtained, which are greatly sought after in photocopiers, laser disc readers or optical fibres.

Some processes for the manufacture of optical articles with a refractive index gradient are known in the state of the art.

Patent Application EP-0407294 describes especially a process for producing a lens with an index gradient which is based on the diffusion, in a preform, of a swelling mixture of two or more monomers, the composition of which changes in the course of time. The index distribution is controlled with the aid of the composition of the swelling mixture. The whole is subsequently polymerized. An index gradient has thus been obtained over 30 mm with a total index variation of 0.085.

Patent Application EP-0504011 describes the production of a lens with an index gradient consisting of an IPN (interpenetrating networks) material obtained by swelling a polymer preform under stress. A preform of defined geometry is confined in a mould the volume of which is of different geometry and greater than that of the preform. The free interstitial volume is filled with a swelling mixture of monomers whose refractive index is different from that of the preform. The preform swells until it adopts the form of the mould. The swelling gradient depends exclusively only on the two geometries chosen for the preform and the swelling volume. The monomers are chosen according to their refractive index and their compatibility.

A process for the manufacture of optical fibres with a radial index gradient is also known, as described in the paper by Ohtsuka, Koike (Applied Optics, 24 (24), pages 4316 to 4320 (1985)).

According to this process a mixture of photopolymerizable monomers and of an initiator is introduced into glass tubes arranged in a circle around a mercury vapour lamp. The tubes are rotated in relation to their respective axis, while the lamp moves vertically at a constant speed. Masks are applied to each tube in order that only a part should be irradiated. At any point of each tube the mixture of monomers is exposed to light for the same period determined by the ratio of the height of the window/speed of the lamp. Polymer rods are thus obtained which are then placed in a vacuum oven at 50° C. for 5 days. The optical fibres are obtained by mechanical drawing, under heat treatment, of these rods.

SUMMARY OF THE INVENTION

A new process for obtaining transparent articles with a refractive index gradient is described below.

The process of the invention is essentially characterized by the fact that it includes the following stages:

1) a crosslinkable liquid mixture of photopolymerizable monomers is subjected to an irradiation which is modulated spatially in intensity and/or irradiation time according to the desired index profile until a self-supporting polymer is obtained;

2) the said polymer is swollen to thermodynamic equilibrium in a composition containing a polymerization initiator and one or several polymerizable monomers producing a polymer of different refractive index from that of the polymer of the base matrix;

3) the swelling composition which has diffused into the matrix is polymerized homogeneously in order to obtain the final article with a refractive index gradient.

The irradiation intensity is intended to mean the luminous power (expressed in watts per unit of area), also called illuminance.

According to the process of the invention the aim of the first stage is to generate within the matrix obtained by photopolymerization a structure gradient whose profile corresponds overall to the desired final index profile.

The recording of this structure gradient and the polymerization of the material until the latter becomes self-supporting take place together during this first stage.

The various regions thus created within the polymer exhibit variable swellabilities, and this property is exploited during the second stage.

During the second stage of the process of the invention a differential swelling is produced within the matrix and a concentration gradient of the swelling composition is thus superposed onto the structure gradient.

The former is produced in practice merely by placing the matrix in contact in the swelling composition, for example by immersion.

The third stage of polymerization of the swelling composition which has diffused into the base matrix is carried out either by UV irradiation or by heat treatment.

Mixtures of photopolymerizable monomers which are more particularly suited for making use of the invention are mixtures containing at least one monofunctional monomer and at least one polyfunctional crosslinking agent.

DETAILED DESCRIPTION OF THE PREFERRED EMBODIMENTS

Figure 1:
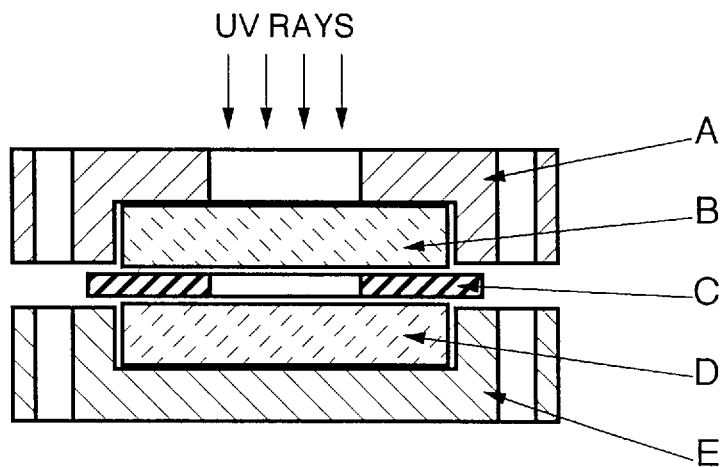
FIG. 1 schematically illustrates a mold in which the mixture is photopolymerized.

The monofunctional monomers are chosen preferably from monomers of acrylate or methacrylate type.

Glycidyl methacrylate (GMA) may be mentioned among the photopolymerizable monomers of the methacrylate type. Tetrahydrofurfuryl acrylate (THFA) and ethyldiglycol acrylate (EDGA) may be mentioned among the acrylates. Among these, EDGA is particularly preferred.

The polyfunctional crosslinking agent is preferably chosen from the polyfunctional monomers in which the reactive functional group is of the same type as the monofunctional monomer. In the case of a monofunctional monomer of the acrylate type the crosslinking agent preferably chosen is a polyacrylate monomer such as pentaerythritol triacrylate (PETA), trimethylolpropane triacrylate (TMPTA), tripropylene glycol diacrylate (TPGDA), 1,6-hexanediol diacrylate (HDDA) or a monomer of formula:

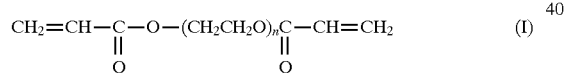

$$CH_2=CH-\underset{O}{\underset{\|}{C}}-O-(CH_2CH_2O)_n\underset{O}{\underset{\|}{C}}-CH=CH_2 \quad (I)$$

where n varies from 1 to 5.

The preferred compounds of formula (I) are diethylene glycol diacrylate (n=2) (DEGDA), triethylene glycol diacrylate (n=3) (TEGDA) and tetraethylene glycol diacrylate (n=4) (TTEGDA).

In order to improve the swellability during the second stage of the process it is desirable to employ a crosslinking agent which, besides the reactive functional groups of the same type, exhibits structural similarities with the photopolymerizable monofunctional monomer and the monomer(s) of the swelling composition, for example because of the presence of common units.

In particular, when EDGA is employed as photopolymerizable monofunctional monomer and 2-phenoxyethyl acrylate (POEA) as swelling monomer, each possessing at least one —$OCH_2CH_2O$— unit, crosslinking agents such as DEGDA, TEGDA or TPGDA which have identical or similar

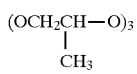

$$(OCH_2\underset{\underset{CH_3}{|}}{CH}-O)_3$$

units are preferably employed.

The concentration of crosslinking agent in the base photopolymerizable mixture is preferably lower than or equal to 10% by weight and more particularly lower than or equal to 3% by weight relative to the weight of the base photopolymerizable mixture. In general it is preferred to operate at concentrations of the order of 1% by weight.

It has been found that the structural differences resulting in the variations in swelling and hence the variations in refractive index are more pronounced in the case of different illuminances when the concentrations of crosslinking agent are relatively low.

The base mixture also contains a photoinitiator.

The photoinitiators employed according to the invention are preferably chosen from acetophenones and more particularly dimethoxyphenylacetophenone (DMPA).

The commercial products defined in the following table may be cited as examples of photoinitiators:

| Trade name | Formula | Absorption wavelength (nm) |
|---|---|---|
| Irgacure 651 | ⟨Ph⟩—C(=O)—C(OCH$_3$)(OCH$_3$)—⟨Ph⟩ | 342 |
| ESACURE KIP | [CH$_3$–CH$_2$]$_n$ attached to ⟨Ph⟩—C(=O)—C(CH$_3$)(OH)(CH$_3$) | 365 |

-continued

| Trade name | Formula | Absorption wavelength (nm) |
|---|---|---|
| Darocur 1116 | CH₃-CH(CH₃)-C₆H₄-C(=O)-C(CH₃)(OH)-CH₃ | 365 |
| Darocur 1173 | C₆H₅-C(=O)-C(CH₃)(OH)-CH₃ | 365 |
| Darocur 1664 = ITX + Darocur 1173 | 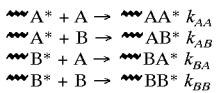 ITX | 388 |

The photoinitiator is preferably employed in the photopolymerizable mixture in a proportion of between 0.01 and 20% by weight relative to the total weight of the mixture, and more particularly in a quantity of approximately 0.1% by weight.

A preferred embodiment consists in employing a photopolymerizable mixture containing at least two monomers whose reactivity coefficients are very different.

The reactivity coefficients $r_1$ and $r_2$ for two different monomers A and B are the ratios of the kinetic constants of the different propagation reactions:

$$\sim\!\!A^* + A \rightarrow \sim\!\!AA^* \quad k_{AA}$$
$$\sim\!\!A^* + B \rightarrow \sim\!\!AB^* \quad k_{AB}$$
$$\sim\!\!B^* + A \rightarrow \sim\!\!BA^* \quad k_{BA}$$
$$\sim\!\!B^* + B \rightarrow \sim\!\!BB^* \quad k_{BB}$$

with $$r_1 = \frac{k_{AA}}{k_{AB}} \quad r_2 = \frac{k_{BB}}{k_{BA}}$$

$\sim\!\!$ X* denotes a polymer chain ending in a radical derived from the monomer X (X=A, B).

Tables of reactivity coefficients for pairs of known monomers appear in general works on organic chemistry, for example in the "Polymer Handbook", 3rd ed. John Wiley & Sons, II/153–251 (1989).

The base photopolymerizable mixture preferably includes two monofunctional monomers A and B whose respective reactivity coefficients are very different, and the polyfunctional crosslinking agent as defined above.

It is possible, in particular, to choose two monomers comprising two polymerizable functional groups of different nature, which are chosen, for example, from acrylic, methacrylic, acrylate and methacrylate functional groups.

Preferably, however, a first monofunctional monomer A of acrylate type is employed, such as those defined above, and a second monofunctional monomer B of perfluoroacrylate type, like 2,2,2-trifluoroethyl acrylate (3-FA). Because of the presence of perfluoroalkyl groups, the latter exhibits lower reactivity when compared with the corresponding monomer not comprising a group of this type.

It is also possible to lower the refractive index of the matrix and to obtain larger index differences in the final article when swelling with a swelling composition generating a polymer of high index is performed.

The monofunctional monomer of perfluoroacrylate type is generally introduced in concentrations which are lower than or equal to 20% by weight, preferably lower than or equal to 10% by weight.

The photopolymerizable base mixture is placed between two moulds, at least one of which is transparent to the UV radiation.

An irradiation whose luminous power is modulated spatially according to the desired index profile is then performed until the polymer sets into gel and then becomes self-supporting. It can then be handled.

The index variation produced locally by the swelling which is produced subsequently during the second stage will be proportionally higher the greater the power received locally.

In practice, in order to apply the desired index modulation it is possible to place a grey-level fixed mask between the source and the photopolymerizable mixture or to make use of a laser beam or of interferences of beams of coherent light, or else to employ a rotating mask exhibiting a profile of appropriate opaque regions.

Such irradiation modulation techniques are conventional and have already been described, for example in document FR-2661914 (Essilor).

The irradiation conditions may be widely different according to the type of gradient required.

The conditions that can be employed for making use of the invention are preferably:
an intensity varying from 3 mW/cm² to 300 mW/cm²
for a period of 30 seconds to 10 minutes.

In the second stage of the process of the invention the matrix obtained at the end of the first stage is swollen in a composition capable of producing a polymer that has a different refractive index from the polymer forming the base matrix obtained in the first stage.

The swelling mixture preferably contains one or several monofunctional monomers which give rise to a polymer that has a different refractive index from that of the base matrix.

If a monomer producing a polymer of low or intermediate refractive index is chosen in the base photopolymerizable mixture, then a monomer producing a polymer of high refractive index, such as 2-phenoxyethyl acrylate (POEA) is chosen as constituent of the swelling composition.

It is also possible to envisage the reverse situation in which a polymer matrix of high refractive index is obtained at the end of the first stage and the swelling of this article is produced in a composition giving rise to a polymer of intermediate to low refractive index. The use of the process according to the first case is more particularly preferred.

In order to obtain index gradients producing sufficient optical power in the final article it is desirable to choose a swelling composition producing a polymer whose refractive index differs by at least 0.02 in relation to the refractive index of the base matrix.

In a preferred embodiment of the invention where the matrix has a fairly low refractive index, preferably lower than or equal to 1.52, a composition containing one or more monofunctional monomers of high refractive index, preferably higher than or equal to 1.54, is diffused, for example aromatic unsaturated monomers such as phenyl acrylate or methacrylate, styrene derivatives, thio(meth)acrylate monomers and POEA.

The swelling composition preferably also contains a crosslinking agent.

This crosslinking agent is preferably chosen from the same type as that employed in the base mixture producing the matrix. It is generally employed in higher concentrations, for example at concentrations of the order of 10%, than in the base mixture.

The introduction of the same crosslinker into the matrix and the swelling composition greatly increases the chemical affinity of the latter for the matrix. The degree of swelling itself is thereby amplified.

The swelling composition also contains a polymerization initiator which may be either a photoinitiator such as those employed in the precursor mixture of the matrix, or a thermal initiator such as azobisisobutyronitrile (AIBN).

The photoinitiator is then employed in the same concentration range as in the base mixture producing the matrix.

The thermal initiator is preferably introduced in a quantity of 0.05 to 0.5% by weight in the swelling mixture.

At the end of the swelling stage the swelling composition should have entered homogeneously into the thickness of the matrix in order to obtain a homogeneous polymerization during the third stage of the process.

To do this, the matrix is swollen substantially at thermodynamic equilibrium, that is to say until its mass is constant.

The swelling times are preferably at least 17 days, preferably from 20 to 35 days.

In the last stage of the process a homogeneous polymerization of the swelling composition is carried out.

This polymerization is produced:
either by a uniform irradiation of the swollen matrix in the case of a photopolymerizable swelling composition,
or by heat treatment of the swollen matrix in the case of a swelling composition containing a thermal initiator.

In this case a progressive temperature rise is produced over a number of hours, or even several days, with, for example, in the case of AIBN, a cycle of 2 days at 60° C. followed by 2 days at 80° C., since AIBN decomposes between 50° and 70° C.

In order to determine the systems consisting of a combination of a base photopolymerizable mixture and a swelling composition which are best suited for making use of the invention (in which a modulated irradiation is performed), it is possible to perform tests on different systems beforehand by performing different irradiations carried out homogeneously during the first stage of the process. The most suitable systems can be deduced by comparing the swelling ratio differences ΔS according to the irradiation performed.

Tables I and II, which follow, illustrate, in the case of 5 different systems, the swelling differences ΔS generated, in the case of each system, by two irradiations performed homogeneously.

In what follows, Tables I and II are explained more precisely through the example of the system No. 1 in Table I.

The procedure was as follows: the composition of the mixture No. 1 (EDGA, 10% PETA) is poured into two separate inorganic glass moulds, each exhibiting identical characteristics.

Each of the two moulds is then subjected to different irradiation conditions.

The first mould is subjected to an irradiation of 21.8 mW/cm$^2$.

The second mould is subjected to an irradiation of 6.25 mW/cm$^2$.

The times are adjusted so that the energy received (or dose) is the same for both samples (in this case 1.16 J/cm$^2$).

The demoulding of the samples (or matrix) is performed. The sample obtained under an irradiation of 21.8 mW/cm$^2$ is called sample A. The sample obtained under an irradiation of 6.25 mW/cm$^2$ is called sample B.

Each of the samples is swollen to equilibrium in the mixture No. 2 (POEA).

$S_A$ is then measured, which is the swelling ratio of sample A.

$$G_A = \left[ \frac{m_f}{m_i} - 1 \right] \times 100$$

$m_f$=mass of the swollen polymer $m_i$=mass of the dry polymer

In the same way $S_B$ is measured for sample B.

$\Delta S = S_B - S_A$ is the difference in swelling ratios, produced by the two different irradiation methods, and is also expressed as a percentage.

The value ΔS/mean S represents the relative variation in the swelling ratio, obtained for the two different irradiation methods. (mean S=$(S_B+S_A)/2$).

An analogous procedure is followed to obtain and calculate the results of the systems 2 to 5 in Table I.

With regard to Table II, the method is identical, except that the irradiation is performed at constant irradiation time for each matrix/swelling agent system.

It is seen that systems 3, 4 and 5, consisting of a photopolymerizable mixture containing two monofunctional monomers of different reactivity and a polyfunctional crosslinking agent and of a swelling composition based on a monofunctional monomer and preferably containing a polyfunctional crosslinking agent, exhibit good sensitivity to irradiation, that is to say the highest ΔS/mean S and therefore the highest foreseeable differences in refractive index.

TABLE I

| System | 1 | 2 | 3 | 4 | 5 |
|---|---|---|---|---|---|
| Mixture No. 1 (matrix) | EDGA 10% PETA | EDGA 1% PETA | EDGA 10% 3-FA 1% PETA | EDGA 10% 3-FA 1% TPGDA | EDGA 10% 3-FA 1% TPGDA |
| Mixture No. 2 (swelling agent) | POEA | POEA | POEA | POEA | POEA 10% TPGDA |
| Irradiation | | | | | |
| I (mW/cm$^2$) | 21.8/6.25 | 22.3/7.1 | 22.3/7.3 | 29/7.3 | 29.2/7.2 |
| dose (J/cm$^2$) | 1.16 | 6.3 | 6.3 | 1.2 | 1.3 |
| ΔS (%) | 5 | 13 | 11 | 35 | 80 |
| ΔS/mean S (%) | 8 | 4.7 | 4.2 | 9.5 | 19 |

Maximum variations in swelling ratio at constant luminous dose for systems 1 to 5.

TABLE II

| System | 1 | 2 | 3 | 4 | 5 |
|---|---|---|---|---|---|
| Mixture No. 1 (matrix) | EDGA 10% PETA | EDGA 1% PETA | EDGA 10% 3-FA 1% PETA | EDGA 10% 3-FA 1% TPGDA | EDGA 10% 3-FA 1% TPGDA |
| Mixture No. 2 (swelling agent) | POEA | POEA | POEA | POEA | POEA 10% TPGDA |
| Irradiation | | | | | |
| I (mW/cm$^2$) | 21.8/6.25 | 22.3/7.1 | 22.3/7.3 | 29/7.3 | 29.2/7.2 |
| it(s) | 160 | 600 | 180 | 125 | 120 |
| ΔS (%) | 2 | 5 | 21 | 40 | 65 |
| ΔS/mean S (%) | 3.2 | 1.8 | 8 | 11.1 | 15.6 |

Maximum variations in swelling ratio at constant irradiation times for systems 1 to 5.

The examples which follow are used to illustrate the invention without, however, being limiting in their nature.

EXAMPLES

The base photopolymerizable liquid mixture (mixture No. 1) contains the following constituents in the proportions shown:

| | |
|---|---|
| ethyldiglycol acrylate (EDGA) | 88.9% |
| 2,2,2-trifluoroethyl acrylate (3-FA) | 10% |
| tripropylene glycol diacrylate (TPGDA) | 1% |
| dimethoxyphenylacetophenone (DMPA) | 0.1% |

The mixture is photopolymerized in a mould the diagram of which is shown in FIG. 1, where the various parts shown have the following characteristics:

| Part | Name | Thickness | Diameter | Material |
|---|---|---|---|---|
| A | cover pierced in its centre | 15.5 | 78 | Dural ® |
| B and D | UV-transparent parts | 6.35 | 51.7 | Pyrex ® |
| C | seal controlling the thickness of the matrix | 3 | 59.5 | Teflon ® |
| E | support | 10 | 78 | Dural ® |

The matrices obtained have thicknesses of 3 nm and a diameter of 25 mm. These dimensions have been chosen so as to make the diameter/thickness ratio correspond to that of the industrially manufactured organic glasses.

The Pyrex® window is transparent in the UV range employed. The use of a second part made of Pyrex® makes it possible to obtain a matrix in which both faces are of good optical quality. It is thus possible to judge the transparency of the material obtained and its refractive index can be easily measured.

The Teflon® seal controls the thickness of the sample and increases the reproducibility of the tests performed.

The modulation of the irradiation is performed by two different methods:

A) The UV irradiation may be conducted with a high-pressure mercury vapour lamp of HBO 200 type, the main emission line of which lies between 360 and 370 nm, this lamp being combined with a neutral filter with a transmission gradient (apodizer filter).

The apodizer filter employed is manufactured by the company Reynard Corp. It is a disc of 30 mm diameter and 2.2 mm thickness.

The material of which it is made is fused silica (transparent in the UV range).

Figure 2:
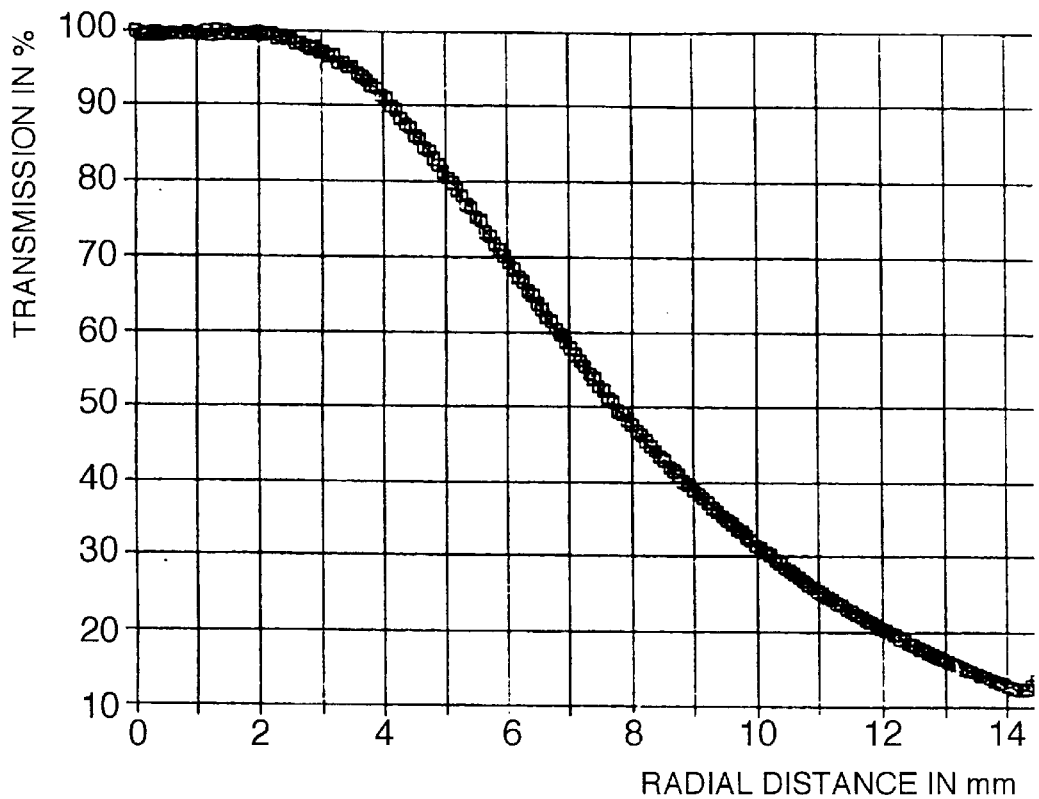
FIG. 2 shows a transmission curve of the apodizer filter as a function of the radial distance in relation to the center.

Its transmission curve as a function of the radial distance in relation to the centre is shown in FIG. 2.

The transmission profile is symmetrical in relation to the centre of the disc.

Thus, when a diameter of the latter is traversed, the transmission is maximal in the centre of the disc and decreases continuously as far as its periphery.

The transmission is the same whatever the wavelength of the UV range.

B) The UV irradiation may also be performed with a UV laser beam. A laser beam is not homogeneous in its diameter and has a profile of Gaussian type.

Figure 3:
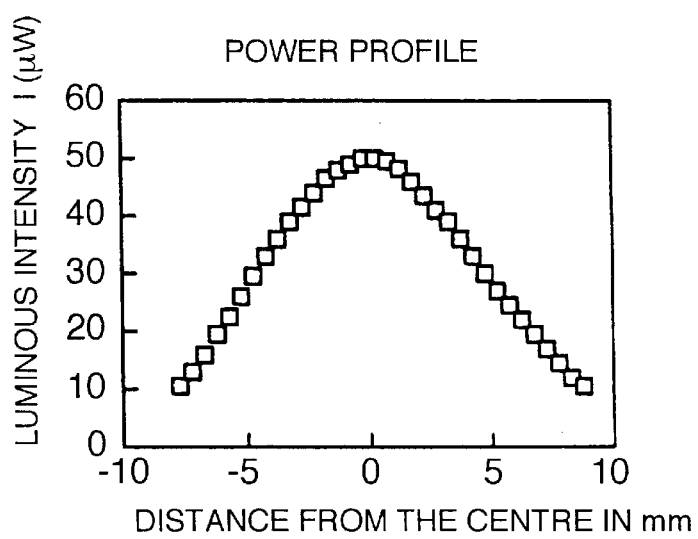
FIG. 3 graphically shows a power profile of the irradiation step.

An irradiation is performed, the power profile of which is shown in FIG. 3, with a Spectra Physics Kr model 2020 laser, UV line at 356.4 nm.

The swelling composition (mixture No. 2) is the following:

| | |
|---|---|
| 2-phenoxyethyl acrylate (POEA) | 89.5% |
| tripropylene glycol diacrylate (TPGDA) | 10% |
| azobisisobutyronitrile (AIBN) | 0.5% |

The matrix obtained after irradiation of mixture 1 is swollen for 18 days in mixture No. 2 and then heated to 70° C. for 20 hours.

Characterization of the index gradient in the final article

The characterization of the gradient employs a technique consisting in measuring the angle D of deviation of a luminous beam on passing through the article with an index gradient and in relating it to the variation in refractive index.

To do this, the article is mounted on a sliding stage with a micrometer screw.

A monochromatic luminous beam produced by an He—Ne green laser source [(d) 543.5 nm] is transmitted.

Figure 4:
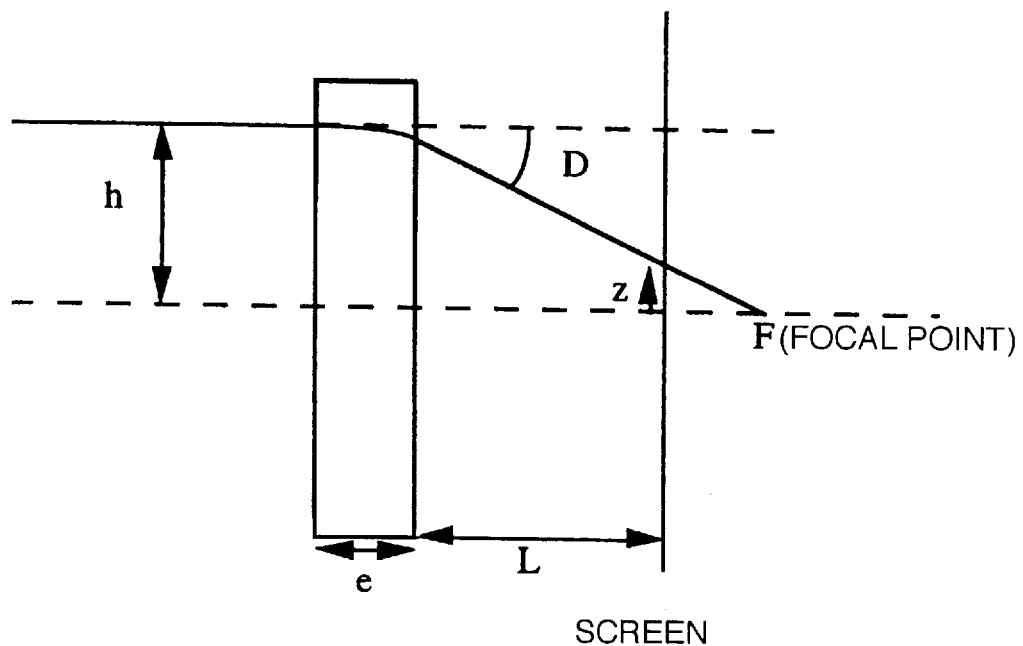
FIG. 4 illustrates the deviated luminous beam striking a screen situated at a given distance.

The deviated luminous beam strikes a screen situated at a given distance. See FIG. 4.

An attempt is made to measure the refractive index n at a given point of the optical component with a refractive index gradient, situated at a distance h from the optical axis. n0 is the index of the article at the optical axis (h=0).

Experimentally, it is simpler to measure on a screen situated at the given distance L the distance z separating the deviated luminous beam from the optical axis of the object.

The variation in n as a function of h is determined by moving the object on the sliding stage with a micrometer screw.

Example 1

The photopolymerizable liquid mixture No. 1 is photopolymerized under a 100 mW laser source according to the method B described above and for a period of 5 minutes.

After swelling in the mixture No. 2 and then polymerization in the conditions set out above, an article of 4.9 mm final thickness is obtained exhibiting a parabolic profile of refractive index verifying the relationship $n(h)=n0 (1+A h^2/2)$, the optical power of which is 1.1 dioptres and the focal distance 0.93 m; the value of An0 is of the order of $2.2\times10^{-4}$. (n0 is the index of the article at the optical axis).

Example 2

The procedure is the same as in Example 1, but with the liquid mixture No. 1 being photopolymerized according to the method A set out above, under 12 mW/cm$^2$ and for 8 minutes.

An article of 4.8 mm final thickness is obtained, exhibiting a parabolic profile of refractive index with an Ano value of the order of $2.4\times10^{-4}$, the optical power of which is 1.15 dioptres and the focal distance 0.87 m.

Example 3

The procedure is the same as in Example 2, but with irradiation under 20 mW/cm$^2$ for 4 minutes. An article with a final thickness of 4.58 mm is obtained, exhibiting a parabolic refractive index profile (with an Ano value of the order of $2.6\times10^{-4}$), an optical power of the order of 1.2 dioptres and a focal distance of the order of 0.85 m.

Figure 5:
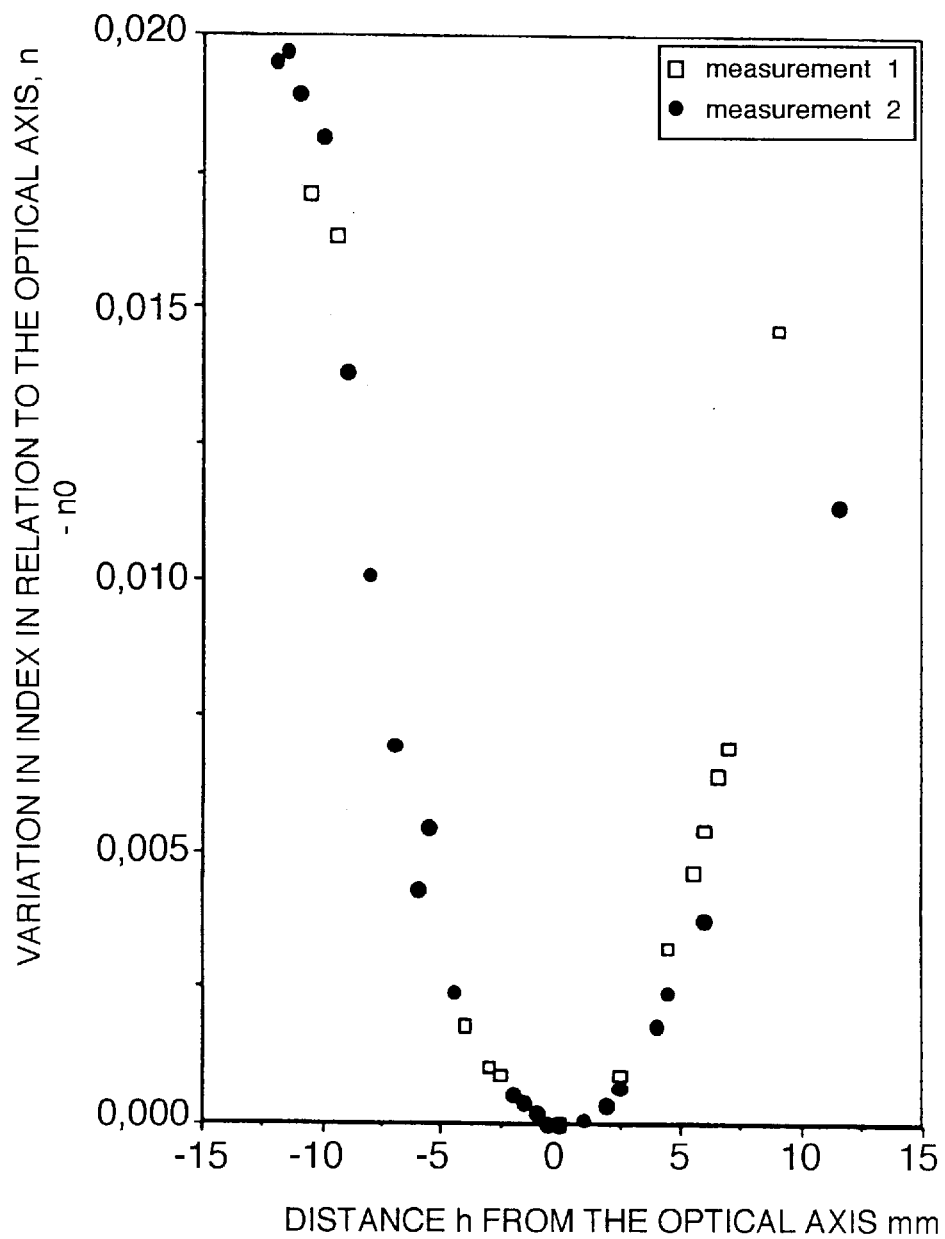
FIG. 5 shows the variations in n-no as a function of h, measured in the final article.

FIG. 5 shows the variations in n-n0 as a function of h, measured in the final article.

We claim:

1. Process for obtaining a transparent article with a refractive index gradient, characterized in that it includes the following steps:

(1) irradiating a crosslinkable liquid mixture of base photopolymerizable monomers which is modulated spatially in intensity and/or irradiation time to form a structure gradient according to an index profile until a self-supporting polymer matrix is obtained;

(2) swelling the said polymer matrix to thermodynamic equilibrium in a swelling composition containing a polymerization initiator and one or more polymerizable monomers producing a polymer of different refractive index from the refractive index of the matrix obtained in step (1);

(3) polymerizing the swelling composition which has diffused into the matrix homogeneously, thereby obtaining a transparent article with a refractive index gradient.

2. Process according to claim 1, characterized in that the mixture of base photopolymerizable monomers contains at least one monofunctional monomer and at least one polyfunctional crosslinking agent.

3. Process according to claim 2, characterized in that the monofunctional monomer is chosen from monofunctional monomers selected from the group consisting of acrylate monomers and methacrylate monomers.

4. Process according to claim 2, characterized in that the polyfunctional crosslinking agent is a polyfunctional monomer in which a reactive functional group is of the same type as the monofunctional monomer.

5. Process according to claim 2, characterized in that the monofunctional monomer is selected from the group consisting of tetrahydrofurfuryl acrylate (THFA), glycidyl methacrylate (GMA) and ethyldiglycol acrylate (EDGA) and the polyfunctional crosslinking agent is selected from the group consisting of pentaerythritol triacrylate (PETA), trimethylolpropane triacrylate (TMPTA), tripropylene glycol diacrylate (TPGDA), 1,6-hexanediol diacrylate (HDDA) and compounds of formula (I):

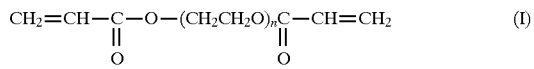

where n varies from 1 to 5.

6. Process according to claim 5, characterized in that the compound of formula (I) is selected from the group consisting of triethylene glycol diacrylate (TEGDA), diethylene glycol diacrylate (DEGDA) and tetraethylene glycol diacrylate (TTEGDA).

7. Process according to claim 2, characterized in that the polyfunctional crosslinking agent has a reactive functional group of the same type as the monofunctional monomer of the mixture of base photopolymerizable monomers and a structure similar to that of the monomer(s) of the swelling composition.

8. Process according to claim 7, characterized in that the mixture of photopolymerizable monomers contains at least the monomer EDGA and a crosslinking agent selected from the group consisting of DEGDA, TEGDA and TPGDA, and the swelling composition contains at least one 2-phenoxyethyl acrylate (POEA) monomer.

9. Process according to claim 2, characterized in that the crosslinking agent is present in concentrations which are lower than or equal to 10% by weight relative to the weight of the base photopolymerizable mixture.

10. Process according to claim 2, characterized in that the base photopolymerizable mixture contains a photoinitiator in proportions of between 0.01 and 20% by weight.

11. Process according to claim 10, characterized in that the photoinitiator is chosen from acetophenones.

12. Process according to claim 2, characterized in that the crosslinking agent is present in concentrations which are lower than or equal to 3% by weight relative to the weight of the base photopolymerizable mixture.

13. Process according to claim 1, characterized in that the mixture of base photopolymerizable monomers contains at least two monomers whose reactivity coefficients are different.

14. Process according to claim 13, characterized in that the base photopolymerizable mixture comprises two monofunctional monomers A and B of different reactivity coefficient and a polyfunctional crosslinking agent.

15. Process according to claim 13, characterized in that the base photopolymerizable mixture comprises at least two monofunctional monomers A and B containing two different functional groups selected from the group consisting of acrylic, methacrylic, acrylate and methacrylate and a polyfunctional crosslinking agent.

16. Process according to claim 13, characterized in that the base photopolymerizable mixture includes at least one first monofunctional monomer A of acrylate type and a second monofunctional monomer B of perfluoroacrylate type.

17. Process according to claim 16, characterized in that the monomer B is 2,2,2-trifluoroethyl acrylate and that it is present in a concentration lower than or equal to 20% by weight relative to the weight of the base photopolymerizable mixture.

18. Process according to claim 16, characterized in that the monomer B is 2,2,2-trifluoroethyl acrylate and is present in a concentration lower than or equal to 10% by weight relative to the weight of the base photopolymerizable mixture.

19. Process according to claim 1, characterized in that in irradiation stage (1) modulation of luminous power is performed by a method selected from the group consisting of interposing a grey-level stationary mask between a source and the photopolymerizable mixture, employing a laser beam or interferences of beams of coherent light, and employing a rotating mask exhibiting a profile of appropriate opaque regions.

20. Process according to claim 1, characterized in that the irradiation is performed at an intensity varying from 3 $mW/cm^2$ to 300 $mW/cm^2$ for a period of 30 seconds to 10 minutes.

21. Process according to claim 1, characterized in that the swelling composition comprises one or several monofunctional monomers producing a polymer whose refractive index differs by at least 0.02 relative to the refractive index of the polymer of the base matrix.

22. Process according to claim 21, characterized in that the swelling composition contains one or several monofunctional monomers of refractive index which is higher than or equal to 1.54 and that the matrix has a refractive index lower than or equal to 1.52.

23. Process according to claim 22, characterized in that the swelling monofunctional monomers are chosen from phenyl methacrylate or acrylate, styrene derivatives, thio (meth)acrylates and POEA.

24. Process according to claim 1, characterized in that the swelling composition contains a crosslinking agent.

25. Process according to claim 24, characterized in that the crosslinking agent for the swelling composition is employed in higher concentrations than those employed in the base photopolymerizable mixture.

26. Process according to claim 24 or characterized in that the crosslinking agent for the swelling composition employed is identical with that present in the mixture of base photopolymerizable monomers.

27. Process according to claim 1, characterized in that the swelling composition contains a photoinitiator in concentrations of between 0.01 and 20% by weight relative to the weight of the composition.

28. Process according to claim 27, characterized in that stage (3) of polymerization of the swelling composition is carried out:
by uniform irradiation of the swollen matrix.

29. Process according to claim 1, characterized in that the swelling composition contains a thermal initiator in concentrations of between 0.05 and 0.5% by weight.

30. Process according to claim 29, characterized in that stage (3) of polymerization of the swelling composition is carried out by heat treatment of the swollen matrix.

31. Process according to claim 1 characterized in that swelling is effected for a time of at least 17 days.

32. Process according to claim 1, characterized in that swelling is effected for a time ranging from 20 to 35 days.

* * * * *